(12) United States Patent
Altmueller et al.

(10) Patent No.: US 8,968,944 B2
(45) Date of Patent: Mar. 3, 2015

(54) HUMIDIFIER DEVICE FOR HUMIDIFYING A FLUID IN A FUEL CELL SYSTEM

(75) Inventors: Bernd Altmueller, Birkenau (DE); Harald Ehrentraut, Darmstadt (DE); Udo Eping, Darmstadt (DE); Simon Hollnaicher, Uhingen (DE); Peter Wisshak, Baltmannsweiler (DE)

(73) Assignee: Daimler AG, Stuttgart (DE)

( * ) Notice: Subject to any disclaimer, the term of this patent is extended or adjusted under 35 U.S.C. 154(b) by 1043 days.

(21) Appl. No.: 13/055,269

(22) PCT Filed: Jul. 8, 2009

(86) PCT No.: PCT/EP2009/004928
§ 371 (c)(1),
(2), (4) Date: Mar. 15, 2011

(87) PCT Pub. No.: WO2010/009811
PCT Pub. Date: Jan. 28, 2010

(65) Prior Publication Data
US 2011/0165478 A1      Jul. 7, 2011

(30) Foreign Application Priority Data
Jul. 23, 2008    (DE) .................. 10 2008 034 406

(51) Int. Cl.
| | |
|---|---|
| *H01M 8/06* | (2006.01) |
| *H01M 2/38* | (2006.01) |
| *H01M 2/40* | (2006.01) |
| *H01M 8/24* | (2006.01) |
| *H01M 8/04* | (2006.01) |
| *B01D 53/22* | (2006.01) |
| *B01D 63/00* | (2006.01) |

(52) U.S. Cl.
CPC .......... *H01M 8/04126* (2013.01); *B01D 53/22* (2013.01); *B01D 63/00* (2013.01); *H01M 8/04141* (2013.01); *H01M 8/04149* (2013.01); *B01D 2313/083* (2013.01); *Y02E 60/50* (2013.01)
USPC ........... 429/413; 429/408; 429/414; 429/458; 429/459

(58) Field of Classification Search
USPC .......................... 429/413, 408, 414, 458, 459
See application file for complete search history.

(56) References Cited

U.S. PATENT DOCUMENTS

| | | | | |
|---|---|---|---|---|
| 5,560,999 | A  * | 10/1996 | Pedicini et al. | 429/407 |
| 6,656,620 | B2 * | 12/2003 | Katagiri et al. | 429/413 |

(Continued)

FOREIGN PATENT DOCUMENTS

| | | |
|---|---|---|
| DE | 102 32 757 A1 | 2/2004 |
| DE | 10 2005 028 7 A1 | 9/2006 |

(Continued)

OTHER PUBLICATIONS

Japanese Office Action with English translation thereof dated Sep. 24, 2013 {Three (3) pages}.

(Continued)

*Primary Examiner* — Patrick Ryan
*Assistant Examiner* — Julian Anthony
(74) *Attorney, Agent, or Firm* — Crowell & Moring LLP

(57) ABSTRACT

A humidifier device for humidifying a fluid in a fuel cell system of a motor vehicle is provided. The humidifier device has a housing, in which is arranged at least one membrane, and a bypass channel for bypassing the at least one membrane. The bypass channel has a non-circular cross-section.

8 Claims, 3 Drawing Sheets

(56) References Cited

U.S. PATENT DOCUMENTS

| | | |
|---|---|---|
| 6,872,484 B2 | 3/2005 | Katagiri et al. |
| 2003/0012993 A1 | 1/2003 | Katagiri et al. |
| 2007/0122669 A1 | 5/2007 | Kusano et al. |
| 2009/0121366 A1 | 5/2009 | Leister et al. |

FOREIGN PATENT DOCUMENTS

| | | |
|---|---|---|
| JP | 7-235324 A | 9/1995 |
| JP | 9-217950 A | 8/1997 |
| JP | 2003-31245 A | 1/2003 |
| JP | 2003-65566 A | 3/2003 |
| JP | 2005-129513 A | 5/2005 |
| JP | 2006-331882 A | 12/2006 |
| JP | 2007-212018 A | 8/2007 |

OTHER PUBLICATIONS

Corresponding International Search Report (Form PCT/ISA/210) including Forms PCT/ISA/220 and PCT/ISA/237 (Fourteen (14) pages).

* cited by examiner (State of the Art)

HUMIDIFIER DEVICE FOR HUMIDIFYING A FLUID IN A FUEL CELL SYSTEM

CROSS REFERENCE TO RELATED APPLICATIONS

The present application is a National Stage of PCT International Application No. PCT/EP2009/004928, filed Jul. 8, 2009, and claims priority under 35 U.S.C. §119 to German Patent Application No. 10 2008 034 406.0, filed Jul. 23, 2008, the entire disclosure of these documents are herein expressly incorporated by reference.

BACKGROUND AND SUMMARY OF THE INVENTION

The present invention relates to a humidifier device for humidifying a fluid in a fuel cell system of a motor vehicle, with a housing, in which is arranged at least one membrane, and with a bypass channel for bypassing the at least one membrane.

These humidifier devices are already known in the state of the art. DE 102 32 757 A1 discloses a humidifier device which serves for humidifying a gas flow to be humidified, which is provided for a fuel cell system. A humid exhaust gas from the fuel cell system is thereby used for humidifying. A membrane is arranged in the humidifier device, which is only permeable to water vapor. This known humidifier device further provides a bypass channel, through which the gas flow can partially be guided around the membrane. The dew point in the gas flow to be humidified can thereby be adjusted freely.

The present invention is directed to the design or the construction of the humidifier device with regard to an arrangement thereof in an installation space available in a motor vehicle, and with regard to an increase of an effective volume of the humidifier device. The effective volume is presently meant to be a volume which is used for the actual function of the humidifier device, that is, for the humidification of the fluid.

Figure 1:
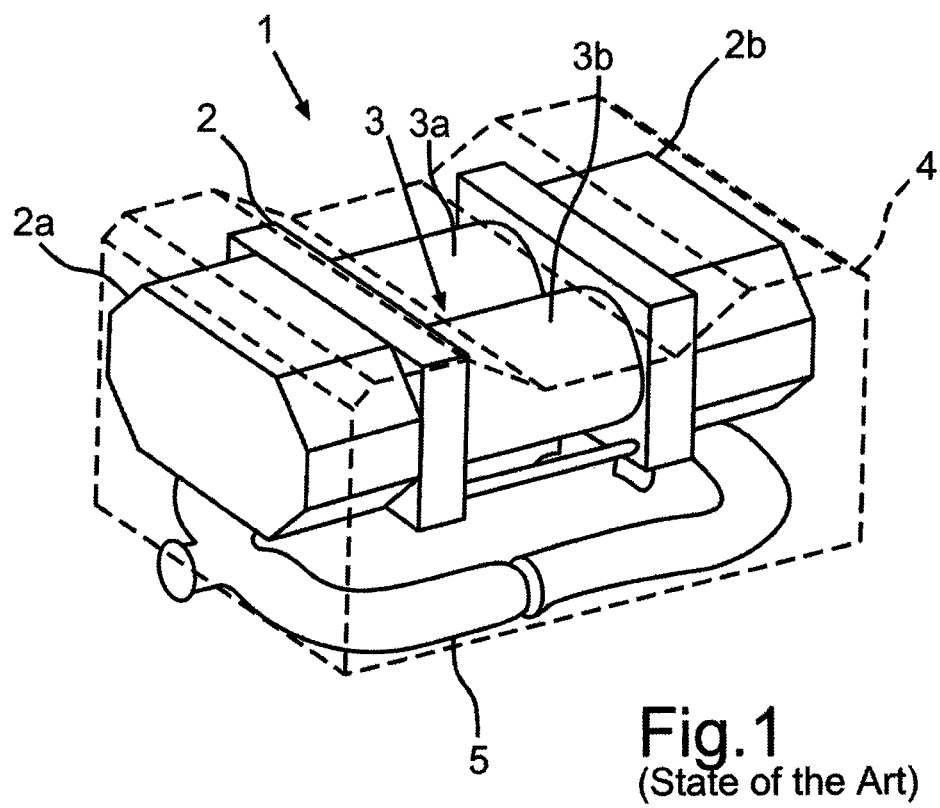

A humidifier device known in the state of the art is shown in FIG. 1. The known humidifier device 1 comprises a housing 2, which consists of two housing parts 2a, 2b. A humidifying unit 3 is arranged between the housing parts 2a, 2b, which has at least one membrane, which is only permeable to water vapor as known. In the known humidifier device 1, the humidifying unit 3 is formed by two cartridges 3a, 3b arranged adjacent to one another, which respectively have at least one membrane.

FIG. 1 also shows an installation space 4 for the humidifier unit 1 available in the motor vehicle. The volume of the two cartridges 3a, 3b represents the effective volume of the humidifier device 1. As shown in FIG. 1, spacings result in the available installation space 4 by using cartridges 3a, 3b with a circular cross-section. Due to the spacings resulting from the design of the humidifier unit 3, the available installation space 4 is not used in an optimal manner for the actual function of the humidifier device 1, that is, for the humidification of the fluid, so that a small effective volume results. The effective volume is 4.5 l in the humidifier device 1 shown in FIG. 1.

The known humidifier device 1 further comprises a bypass channel 5 for bypassing the membrane arranged in the humidifier unit 3. It is achieved by means of the bypass channel 5, that the humidity degree of the fluid to be humidified and the dew point thereof can be adjusted arbitrarily. As shown in FIG. 1, the bypass channel 5 having a circular cross-section is guided around the housing 2 of the humidifier device 1. A disadvantage of a suboptimal use of the available installation space 4 is also present here, so that a large effective cartridge volume cannot be achieved.

Exemplary embodiments of the present invention provide a humidifier device for humidifying a fluid, where an installation space available for the humidifier unit is used in a better manner for humidifying the fluid. This is achieved by a humidifier device for humidifying a fluid in a fuel cell system of a motor vehicle, the humidifier device comprising a housing with a bypass channel and at least one membrane arranged in the housing, the bypass channel bypassing the at least one membrane, wherein the bypass channel has a non-circular cross-section. The humidifier device can have an angular, rectangular cross-section bypass channel. The bypass channel can be integrated in the housing. The bypass channel can be guided around and abutting the housing. A control element can be arranged in the bypass channel for changing a cross-section of the bypass channel. The control element can be a throttle valve. The control element can be drivable by an actuator that is arranged at or in the housing. The housing can comprise two housing parts, and a single cartridge is arranged between the two housing parts, in which the at least one membrane is integrated. The single cartridge can have a non-circular cross-section. The single cartridge can have an angular, rectangular cross-section. The single cartridge can have a cross-section adapted to a cross section of the two housing parts.

A humidifier device according to the invention is formed for humidifying a fluid in a fuel cell system of a motor vehicle. The humidifier device comprises a housing, in which is arranged at least one membrane. The humidifier device further comprises a bypass channel in a bypass channel for bypassing the at least one membrane. It is provided according to the invention that the bypass channel has a non-circular cross-section. As "cross-section" should be understood as an outer cross-section or an outer contour of a cross-section profile.

A better use of the installation space available for the humidifier device in the motor vehicle is achieved by the humidifier device according to the invention in an advantageous manner, wherein the effective volume of the humidifier device can be increased.

It has been shown to be especially advantageous that the bypass channel has an angular, especially rectangular cross-section. It is especially provided that the bypass channel is formed in the shape of a flat channel integrated in the housing of the humidifier unit. The bypass channel is further preferably arranged in an abutting manner to an inner wall of the housing. If the housing of the humidifier device is cuboidal, a total surface of an inner wall of the housing especially represents an inner wall of the bypass channel. Especially by the use of a flat bypass channel, which extends along an inner wall of the housing, the available installation space is used in a better manner, so that a larger volume for the at least one membrane can be provided.

It can alternatively be provided that the bypass channel is guided around and abutting the housing.

In a preferred manner, a control element for changing a cross-section of the bypass channel which can be flown through is arranged in the bypass channel. The control element is preferably formed as a throttle valve and can preferably be driven by means of an actuator, which is arranged at and/or in the housing. By the use of a control element formed for changing the cross-section of the bypass channel which can be flown through, a humidity degree of the fluid to be humidified and a dew point thereof can be adjusted freely. Using a throttle valve, the change of the cross-section of the bypass channel which can be flown through is further enabled in a technically simple manner. In this embodiment, it can further be provided that the control element is arranged in a connection part or connection region arranged at the housing and comprising a section of the bypass channel. The actuator can be an electric, a pneumatic, or a hydraulic actuator.

It is provided in a preferred embodiment, that the housing comprises two housing parts, and that a cartridge is arranged between the housing parts, in which the at least one membrane is integrated. By using a single cartridge, an installation space available in the motor vehicle for the humidifier device can be used in a better manner—than is the case in the state of the art—with regard to an increase of the effective volume of the humidifier device. In this embodiment it has shown to be particularly advantageous that the single cartridge, in which is arranged the at least one membrane, has a non-circular cross-section, preferably an angular, especially preferred a rectangular cross-section. The single cartridge particularly has a cross-section adapted to a cross-section of the two housing parts. It is achieved hereby that spacings which reduce the effective volume do not result between the cartridge and the two housing parts.

BRIEF DESCRIPTION OF THE DRAWING FIGURES

Further advantages, characteristics and details of the invention result from the following description of a preferred embodiment, and by means of the enclosed drawings.

Figure 2:
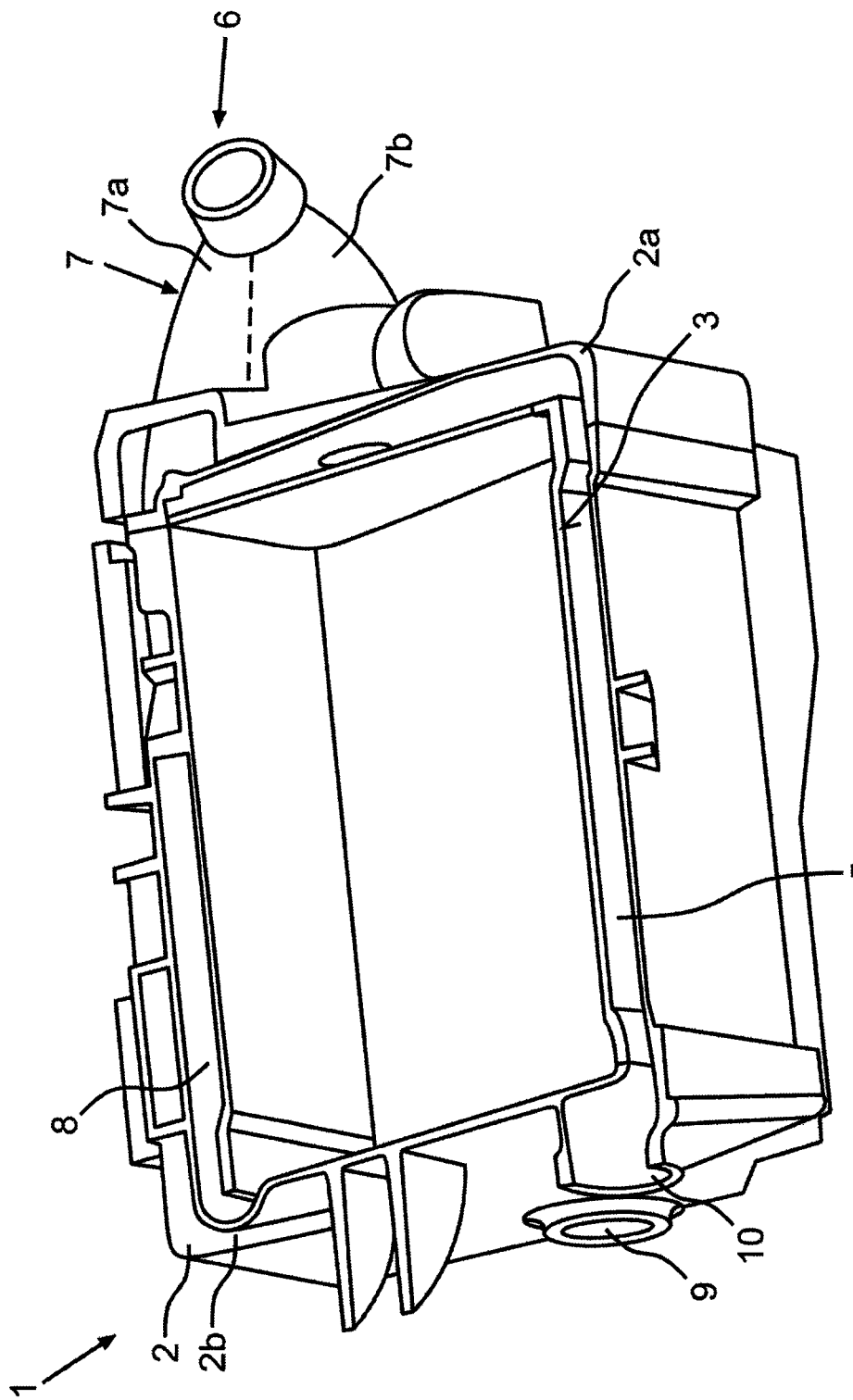
Figure 3:
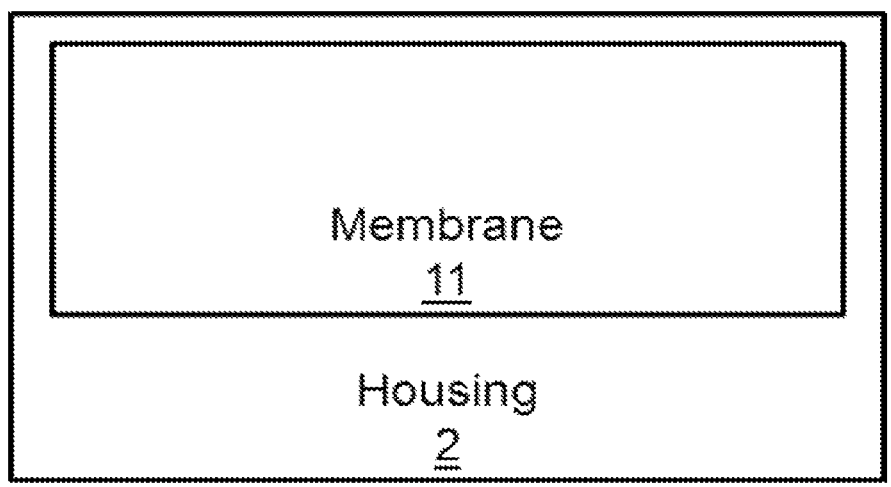

It shows thereby:

FIG. 1 a humidifier device according to the state of the art in perspective;

FIG. 2 a humidifier device according to an embodiment of the invention in perspective; and FIG. 3 is a highly schematic illustration of a membrane arranged in a housing.

DETAILED DESCRIPTION OF THE DRAWING FIGURES

The embodiment explained in more detail in the following shows a preferred embodiment of the present invention.

The same or functionally the same elements are provided with the same reference numerals in the figures.

A humidifier device 1 shown in FIG. 2 according to an embodiment of the present invention is formed for humidifying a fluid in a fuel cell system of a motor vehicle. The humidifier device 1 comprises a housing 2, which has at least two housing parts 2a, 2b, between which is arranged a single cartridge 3. A plurality of membranes (not shown) is arranged in the cartridge 3. FIG. 3 is a highly schematic illustration of at least one membrane 11 arranged in a housing 2.

The humidifier device 1 serves for humidifying air, which is provided to the fuel cell system as oxidation means from the humidifier device 1. The humidifier device 1 comprises an air supply 6, via which the air is supplied to the humidifier device 1 as oxidation means from, for example, a fan of the motor vehicle. The air supply 6 is thereby arranged at a connection part 7, which is arranged at a first housing part 2a of the housing 2. In the connection part 7, a branch-off of the air supply 6 is provided. Thus, the connection part 7 has a first connection channel 7a, via which the fresh air provided by the fan is guided to the at least one membrane into the housing, and a second connection channel 7b. The first connection channel 7a of the connection part 7 is connected to an air channel 8 arranged in the housing in the present example, via which the fresh air is guided to the at least one membrane after entering the housing 2. The second connection channel 7b is presently connected to a bypass channel 5 integrated in the housing 2 for bypassing the at least one membrane. The fresh air provided by the fan can thus be guided around the at least one membrane via the second connection channel 7b and further via the bypass channel 5.

The humidifier device 1 further comprises an exhaust gas connection 9, via which an exhaust gas originating from the fuel cell system comprising a product water is guided to the humidifier device. This exhaust gas, and especially the product water, which is provided in the form of water vapor, is used for humidifying the air supplied to the housing 2 through the air channel 8, by discharging the water vapor via the at least one membrane to the fresh air.

The humidifier device 1 further comprises a fuel cell connection 10, which is coupled to the fuel cell system, and via which the already humidified air is provided to the fuel cell system as oxidation means. This humidified air provided for the fuel cell system thereby represents a mixture of the humidified air supplied to the cartridge 3 via the air channel 8 and the dry air guided via the bypass channel 5.

By using the bypass channel 5, an adjustability of a humidity degree of the air provided for the fuel cell system is enabled in an advantageous manner. For this, the humidifier device 1 further comprises a throttle valve, which is integrated in the second connection channel 7b of the connection part 7. The throttle valve can be actuated by an actuator in the present example. A cross-section of the bypass channel 5 which can be flown through, especially of the second connection channel 7b of the connection part 7, can be changed presently by means of the throttle valve.

So as to optimally use an installation space provided for the humidifier device 1, the bypass channel 5 has a rectangular cross-section in the present example. The bypass channel 5 is further formed in the shape of a flat channel, which is arranged abutting an inner wall of the housing 2, which represents an inner wall of the single cartridge 3. Presently, a total surface of the inner wall also represents an inner wall of the bypass channel 5. By the flat construction of the bypass channel 5, which is arranged laterally in the housing 2, a larger installation space for the at least one membrane is provided compared to a bypass channel having a circular cross-section, that is, for the actual function of the humidifier device 1.

The air channel 8 also has a rectangular cross-section in the present example, and is formed in the shape of a flat channel. The air channel 8 is presently arranged at a side of the housing 2 opposite the bypass channel 5 and abutting an inner wall of the housing 2. A total surface of the inner wall of the housing 2 thereby also represents an inner wall of the air channel 8.

By using flat channels 5, 8, which are arranged at the sides of the housing 2 and are integrated in the housing, and by the integration of the throttle valve in the connection part 7, the given installation space of the motor vehicle can be used in a considerably better manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 Humidifier device
2 Housing
2a, 2b Housing parts
3 Humidifying unit/cartridge
4 Installation space
5 Bypass channel
6 Air supply
7 Connection part
7a, 7b Connection channels
8 Air channel
9 Exhaust gas connection
10 Fuel cell connection

The invention claimed is:

1. A humidifier device for humidifying a fluid in a fuel cell system of a motor vehicle, the humidifier device comprising:
    a housing with an angular outer contour;
    a humidifier cartridge having an angular outer contour and arranged inside of the housing;
    an air supply inlet in the housing;
    an air exhaust outlet in the housing; and
    a bypass channel connected between the air supply inlet and air exhaust outlet and having an angular outer contour,
    wherein the bypass channel is formed between an outer wall of the humidifier cartridge and an inner wall of the housing.

2. The humidifier device according to claim 1, further comprising:
    an air supply channel having an angular outer contour and connected between the air supply inlet and the humidifier cartridge.

3. The humidifier device according to claim 2, wherein the air supply channel is formed on an opposite side of the humidifier device from the bypass channel and is formed between the outer wall of the humidifier cartridge and the inner wall of the housing.

4. The humidifier device according to claim 3, wherein the bypass channel has a flat outer contour.

5. The humidifier device according to claim 2, wherein the air supply channel has a flat outer contour.

6. The humidifier device according to claim 1, wherein a control element is arranged in the bypass channel for changing a cross-section of the bypass channel.

7. The humidifier device according to claim 6, wherein the control element is a throttle valve.

8. The humidifier device according to claim 6, wherein the control element is drivable by an actuator that is arranged at or in the housing.

* * * * *